United States Patent

[11] 3,634,618

[72] Inventor Wilfried von der Ohe
Ludersen, Germany
[21] Appl. No. 802,855
[22] Filed Feb. 27, 1969
[45] Patented Jan. 11, 1972
[73] Assignee Telefunken Patent verwertungsgesellschaft m.b.H.
Ulm/Donau, Germany
[32] Priority Feb. 28, 1968
[33] Germany
[31] P 15 62 039.0

[54] CIRCUIT FOR CONNECTING A TELEVISION SET TO A RECORDING INSTRUMENT
4 Claims, 2 Drawing Figs.

[52] U.S. Cl. 178/6.6 A, 178/6
[51] Int. Cl. H04n 5/22, H04n 5/78, H04n 7/10
[50] Field of Search 178/6, 6.6 A

[56] References Cited
UNITED STATES PATENTS
2,903,509 9/1959 Houghton 178/6.6
3,270,131 8/1966 Dinter 178/6.6
3,377,436 4/1968 Maxey 178/6.6
3,403,221 9/1968 van den Bussche 178/6.6
3,484,548 12/1969 Kowal 178/6

*Primary Examiner*—Bernard Konick
*Assistant Examiner*—Howard W. Britton
*Attorney*—Spencer & Kaye

ABSTRACT: A circuit for connecting a television set to a video recording set includes a terminal connectable to a video signal output terminal of an FM modulating means connected to the television receiver terminal impressing a video signal on a carrier, a transformer having a primary winding DC connected to the output of the modulating means, and a secondary winding which is AC connected to the primary winding to pass the modulated signal, but is DC isolated therefrom. The secondary winding is DC connected to a terminal which may be connected to the recording head of the recorder. The circuit is arranged so that there is no DC electrical connection between the television receiver and the recorder chassis so as to reduce interference therebetween. A further transformer is similarly arranged between the reading head of the recorder and an FM demodulator for use during playback.

INVENTOR
Wilfried Von Der Ohe
BY Spencer & Kaye
ATTORNEYS

CIRCUIT FOR CONNECTING A TELEVISION SET TO A RECORDING INSTRUMENT

BACKGROUND OF THE INVENTION

1. Field of Invention

This invention relates to video recorders, and more particularly to a circuit for connecting video recorders and television sets so as to reduce interference therebetween.

2. Description of the Prior Art

When connecting a television recording instrument, e.g., a home recorder, to a television receiver there exists the following difficulty: Since television receivers generally are provided with an AC/DC connection, i.e., may have their connected chassis connected either to ground or to the full net voltage, and since the chassis of the recording instrument is generally grounded, the chassis of the two instruments must not be directly connected together. The same applies when television receiver and recording instrument each have their own AC/DC connection. Even if the chassis of the two instruments is attached to the same net terminal, ground currents may cause humming interferences.

When the recording instrument is connected to the television receiver via capacitors, considerable hum voltages may be produced. Moreover, such a coupling with capacitors is strongly frequency dependent so that the low video frequencies are only imperfectly transmitted and the DC voltage component required for television playback is lost.

To reduce these drawbacks it is known from the German published Pat. application No. 1,171,948, to modulate the output signal of the recording instrument onto a carrier and to feed it, via a narrow-band transformer, to the input of a video demodulator within the television receiver either directly or via the last broadband intermediate frequency, hereafter IF, amplification stage. The video output signal of the recording instrument must here first be modulated onto a carrier and subsequently demodulated again. Furthermore, this circuit is suited only for playback.

For recording it is known (French Pat. No. 1,388,457) to take the signal from the television receiver in the IF path, e.g., by means of a jacket placed over an IF tube and to feed the signal to the recording instrument via a transformer which effects the DC separation of the two instruments. Such an IF decoupling has the drawback that leaks in the shielding may easily cause interference in that they adversely influence the antenna input. Moreover, this circuit is only suited for recording.

It is known, on the other hand, to simplify the recording of television signals by modulating the video signal onto a carrier in frequency modulation and to record this carrier on the tape. During playback the carrier is demodulated as it comes from the tape.

SUMMARY OF THE INVENTION

It is the object of the present invention to provide a circuit for joining the two instruments in a recording arrangement of the last-mentioned type so as to reduce the interference therebetween which circuit requires very little circuitry.

In the present invention, therefore, the modulation onto a carrier required for the recording process is simultaneously utilized to accomplish the DC isolation of the two instruments with a transformer. The only additional structural element required is the transformer itself since the modulation is required anyhow. Since a modulated carrier-frequency signal is fed through the transformer, it need have only a relatively small bandwidth and need not transmit the low frequencies, particularly the DC voltage.

DESCRIPTION OF THE PREFERRED EMBODIMENTS

Figure 1:
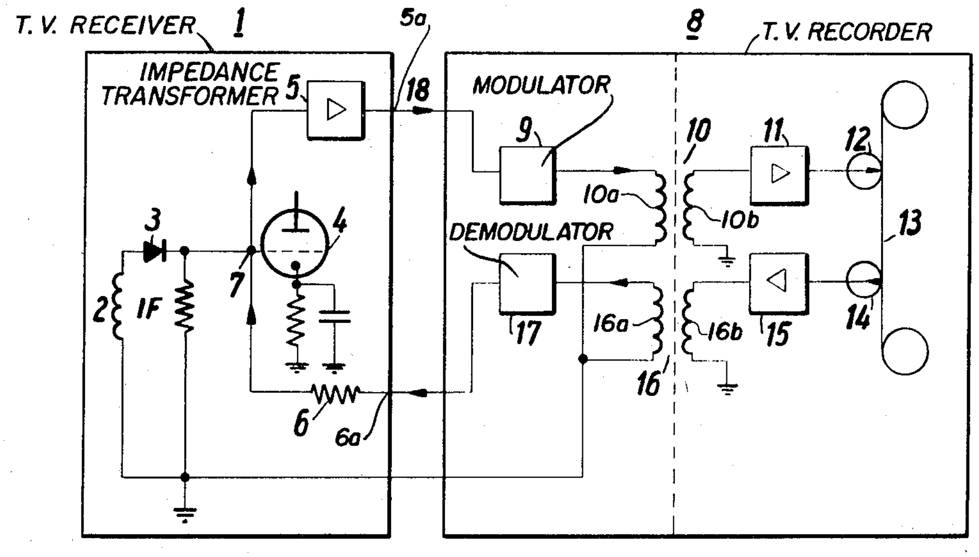
FIG. 1 is a schematic representation of a connection circuit according to the present invention together with a television set and a video recorder.

A television receiver 1 has a coil 2 which furnishes the IF image carrier, a video rectifier 3, a video amplifier tube 4, an impedance transformer 5, a video signal output **5*a*, a video signal input 6*a* and a decoupling resistance 6. The video-frequency television signal is applied to the control grid 7 of the video amplifier tube 4 with its DC voltage component. A recording instrument 8 contains two modulating means, namely an FM modulator 9 and a demodulator 17, a transformer 10, including a primary winding 10*a* and a secondary winding 10*b*, a recording amplifier 11, a recording head 12, a tape 13 to contain the recording, a playback head 14, a playback amplifier 15, and a transformer 16 having primary and secondary windings 16*b*, 16*a***. The primary and secondary windings of each transformer are faradically, i.e., AC coupled, to each other but are galvanically separate, i.e., DC isolated from each other.

During recording the video signal travels from the control grid 7 through the impedance transformer 5 and a connecting line 18 between television receiver 1 and recording instrument 8 to the modulator 9 which produces an AC carrier signal on which the video signal is impressed by frequency modulation. The FM signal has instantaneous frequencies of approximately 1.5 to 4 MHz. According to the present invention, the transformer 10 is disposed between the modulator 9 and the recording amplifier 11. The primary winding **10*a* of transformer 10 is DC connected to the chassis of the television receiver 1. The secondary winding 10*b* is AC connected to winding 10*a* so as to receive the modulator signal by induction. Winding 10*b* is DC connected to the chassis of the recording instrument 8 so that the recording instrument 8 and the television receiver 1 are thus AC connected but DC separated from each other. The modulator 9 is DC connected only with the television receiver and is insulated from chassis of the recording instrument 8. It receives its operating voltage, e.g., from a separate net instrument with a net transformer or, via a separate line, from the television receiver 1. The frequency-modulated carrier signal thus passes through the transformer 10 so that, on the one hand, all frequencies including the impressed DC voltage component are transmitted to the recording head 12 and, on the other hand, no DC connection exists between the recording instrument 8 and the television receiver 1, i.e., when the recorder and the television receiver are connected, the windings 10*a*, 16*a***, which are DC connected with the television receiver are DC isolated from the respective magnetic heads.

During playback the present invention provides, in an analogous manner, a transformer 16 at the input input of the demodulator 17 which transformer again effects the DC separation of the two instruments and the transmission of the carrier coming from tape 13.

The carrier-frequency signal transmitted by the transformer 16 is demodulated in the demodulator 17, which is DC connected in the same manner as modulator 9 and also receives its operating voltage in the same way, and is fed to the control grid 7 of the video tube 4 via the video input **6*a* and the decoupling resistance 6**.

Figure 2:
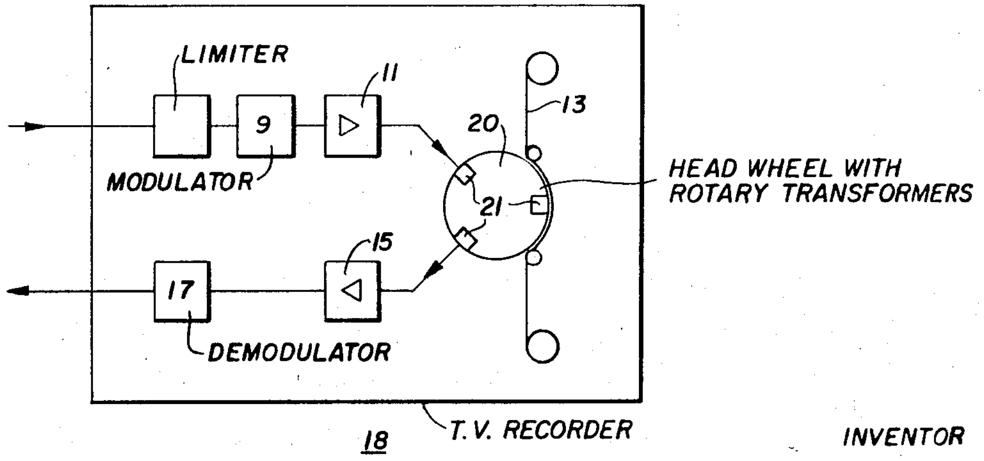
FIG. 2 is a schematic representation of another modification of the invention.

Rotating transformers which transmit, in a recording arrangement having rotating heads, the carrier-frequency signal from a fixed circuit point to a rotating head wheel which carries the heads, can also be employed as transformers 10 or 16, respectively, as shown in FIG. 2. In this case the transformers are disposed between the recording amplifier 11 and the recording head and/or playback head and the playback amplifier 15. In a recording arrangement with a common rotating head wheel 20 the recording head and playback head are preferably the same heads 21. Additional structural components, such as limiters, amplifiers, impedance transformers, separating stages, etc., may be connected on the side of transformers 10, 16 which is connected with the television receiver 1 as well as on the side connected with the recording instrument 8.

It will be understood that the above description of the present invention is susceptible to various modifications, changes and adaptations.

I claim:

1. In a recorder for recording a video signal received from the television receiver having an AC/DC chassis connection and for playing back such video signal having:

an FM modulator whose input is connectable to a video signal output of the television receiver and an FM demodulator whose output is connectable to a video signal input of the television receiver;

recording and playback head means;

a first transformer having its primary winding connected to the output of said modulator and its secondary winding connected to said head means for feeding said video signal to said head means for recording same;

a second transformer having its primary winding connected to said head means and its secondary winding connected to the input of said demodulator for feeding the recorded video signal to said demodulator during playback;

said secondary winding of said first transformer and said primary winding of said second transformer being DC connected to said recorder; the improvement wherein said primary winding of said first transformer, said secondary winding of said second transformer and the components, including said modulator and said demodulator, connected thereto in the signal paths from and to the television receiver are DC isolated from said recorder and DC connected to only said television receiver when said recorder is connected thereto.

2. The combination of claim 1 including means for supplying said modulator and demodulator with operating voltage from the television set.

3. The combination of claim 1 in which said head means is a rotating head wheel bearing recording and playback head means and said transformers are rotating transformers which transmit the modulated signal from a stationary portion of the recorder to said rotating head wheel.

4. The combination of claim 1 including amplifier means which are DC isolated from said recorder between said transformers and said modulator and demodulator respectively.

* * * * *